United States Patent [19]

Shang

[11] Patent Number: 5,077,817

[45] Date of Patent: Dec. 31, 1991

[54] FIBER STAR AMPLIFIER COUPLER AND METHOD OF MAKING SAME

[75] Inventor: Hen-Tai Shang, Taipei, Taiwan

[73] Assignee: Telecommunication Laboratories, Ministry of Communications, Taiwan

[21] Appl. No.: 657,815

[22] Filed: Feb. 20, 1991

[51] Int. Cl.$^5$ .......................... G02B 6/28; H01S 3/30; C03B 23/20

[52] U.S. Cl. ...................................... 385/46; 385/43; 385/89; 385/24; 372/6; 65/4.2

[58] Field of Search ................. 350/96.15, 96.16, 320, 350/96.17, 96.22, 96.20, 96.21; 372/6; 250/227.11; 370/1, 3; 65/4.1, 4.2; 455/606, 607

[56] References Cited

U.S. PATENT DOCUMENTS

| | | | |
|---|---|---|---|
| 4,383,318 | 5/1983 | Barry et al. | 372/6 |
| 4,546,476 | 10/1985 | Shaw et al. | 372/6 |
| 4,550,974 | 11/1985 | Murphy | 350/96.15 |
| 4,553,238 | 11/1985 | Shaw et al. | 372/6 |
| 4,826,275 | 5/1989 | Heinzman | 350/96.16 |
| 4,863,231 | 9/1989 | Byron et al. | 350/96.16 |
| 4,867,518 | 9/1989 | Stamnitz et al. | 350/96.15 |
| 4,941,726 | 7/1990 | Russell et al. | 350/96.15 |
| 4,959,837 | 9/1990 | Février et al. | 372/6 |
| 4,963,832 | 10/1990 | Desurvire et al. | 350/96.15 X |
| 5,007,698 | 4/1991 | Sasaki et al. | 350/96.15 |

Primary Examiner—Brian Healy
Attorney, Agent, or Firm—Wenderoth, Lind & Ponack

[57] ABSTRACT

An optical fiber star amplifier coupler and a fabricating method thereof are disclosed, wherein at least two signal fibers and at least one pump fiber are twisted together and by means of flame fusion method, the twisted portion are fused to form a biconical tapered portion which is then split at the midpoint thereof, a section Er-doped amplifier fiber being then spliced between the two fused tapered ends and the pump fibers being grouped together and put into an N×M array connector to mate with a pump light source, the signal fibers being respectively connected to input ports and output ports, the pump light source emitting pump light with specific wavelength and coupling the pump light into the amplifier fiber through the pump fiber, the amplifier fiber then converting the pump light into a radiation with the same wavelength and phase as the signal light which is guided in through the signal fibers so as to amplify the signal light.

4 Claims, 4 Drawing Sheets

FIBER STAR AMPLIFIER COUPLER AND METHOD OF MAKING SAME

BACKGROUND OF THE INVENTION

The present invention relates to an optical fiber coupler, and more particularly to an optical fiber star amplifier coupler and the fabricating method thereof.

Generally, there are three types of conventional optical fiber networks, i.e., duplex network, T-shaped network and star network, each of which possesses some advantages and shortcomings and is specifically suitable for a certain condition. When many distributed terminals should be linked together for communicating with one another, a possive star coupler of the star network with N input ports and N output ports is widely used to evenly distribute the input signal from each input port to every output ports.

However, as the number of output ports of the star coupler increases, the signal intensity will decrease very fast in accordance with the spliting ratio. This effect limits the maximum number of ports a star coupler can support. For example, current LAN Ethernet system using multimode fiber star coupler can only support less than 33 terminals. An active star coupler is developed to eliminate the shortcomings of the passive star coupler. Such active star coupler functions as the passive star coupler and a relay. It converts received optical signals into electric signals and amplifies the electric signals. The amplified electric signals then energize a light source to produce new high intensity of optical signals which are then evenly distributed to every output ports. However, the amplifying operation of the active star coupler is complicated and the volume thereof is larger with more electronic components contained therein. As a consequence, the manufacturing cost and failure possibility increase. Therefore, such active star coupler appears still unsatisfactory.

SUMMARY OF THE INVENTION

It is therefore a primary object of this invention to provide an optical fiber star amplifier coupler which not only distributes the input signals to output ports but also amplifies the signal inside the coupler itself. So the signal insertion loss (from input ports to output ports) will be significantly reduced and more ports can be serviced by a single coupler.

The present invention can be best understood through the following description and accompanying drawings wherein:

DETAILED DESCRIPTION OF THE PREFERRED EMBODIMENT

Figure 1A:
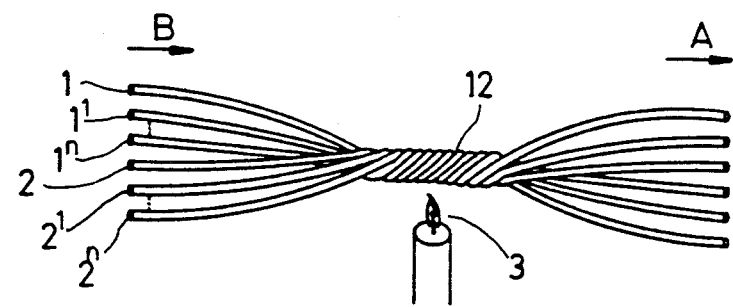
FIGS. 1A through 1D illustrate the manufacturing procedure of the present invention.
Figure 1B:
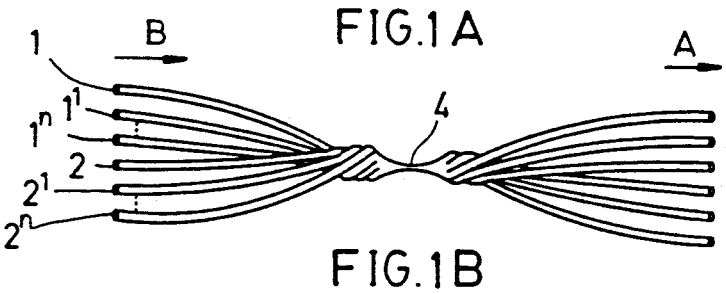
Figure 1C:
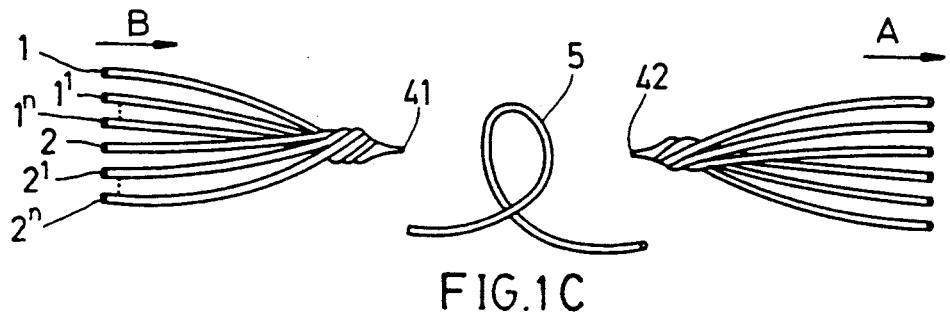
Figure 1D:
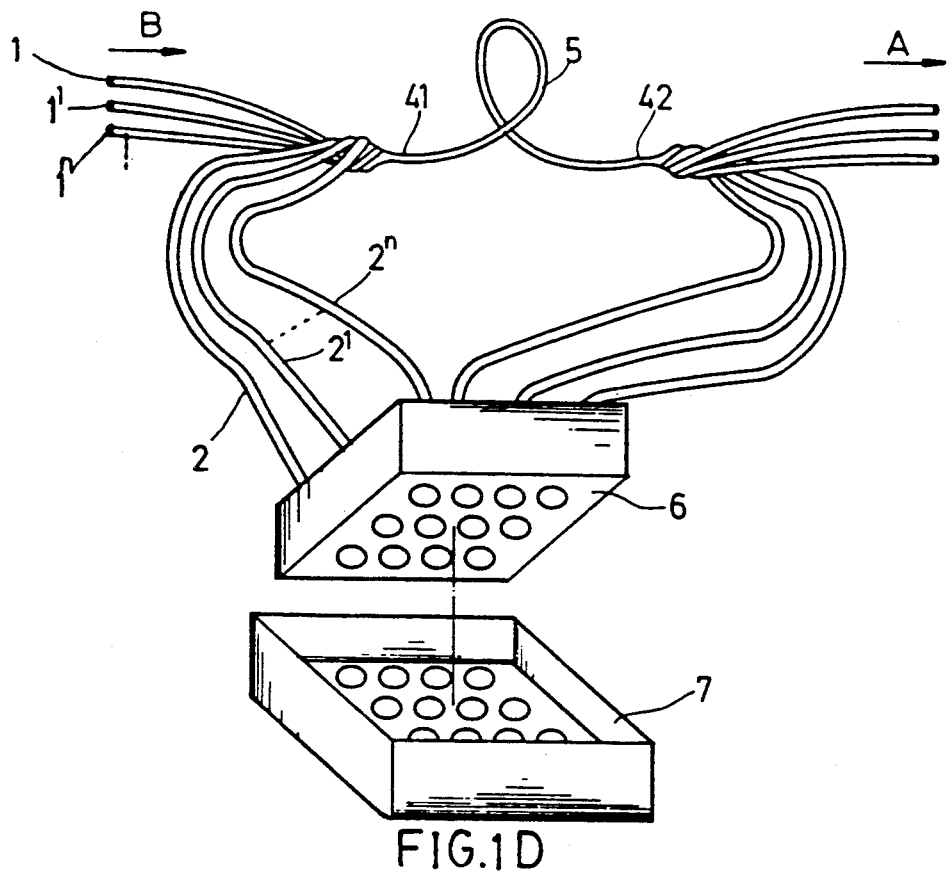

Please first refer to FIGS. 1A through 1D. The fiber star amplifier coupler of this invention is manufactured in the following manner:

First, at least two signal fibers $1, 1' \ldots 1^\eta$ and at least one pump fiber $2, 2', \ldots 2^\eta$ are twisted together and by means of well-known flame fusion method, the twisted portion 12 is fused to form a biconical tapered portion 4;

then a section of erbium doped amplifier fiber 5 (or other type amplifier fiber) is spliced in between (other methods of coupling light in and out the fiber ends can be alternatively used) the two fused tapered ends 41, 42; and then the pump fibers $2, 2', \ldots 2^\eta$ are grouped together and put into an $N \times M$ array connector 6 to mate with an $N \times M$ surface emitting laser diode array 7 while the signal fibers $1, 1', \ldots 1^\eta$ are respectively connected to the input/output ports $8, 8', \ldots 8^\eta$ which further connect with terminals $9, 9', \ldots 9^\eta$.

Figure 2:
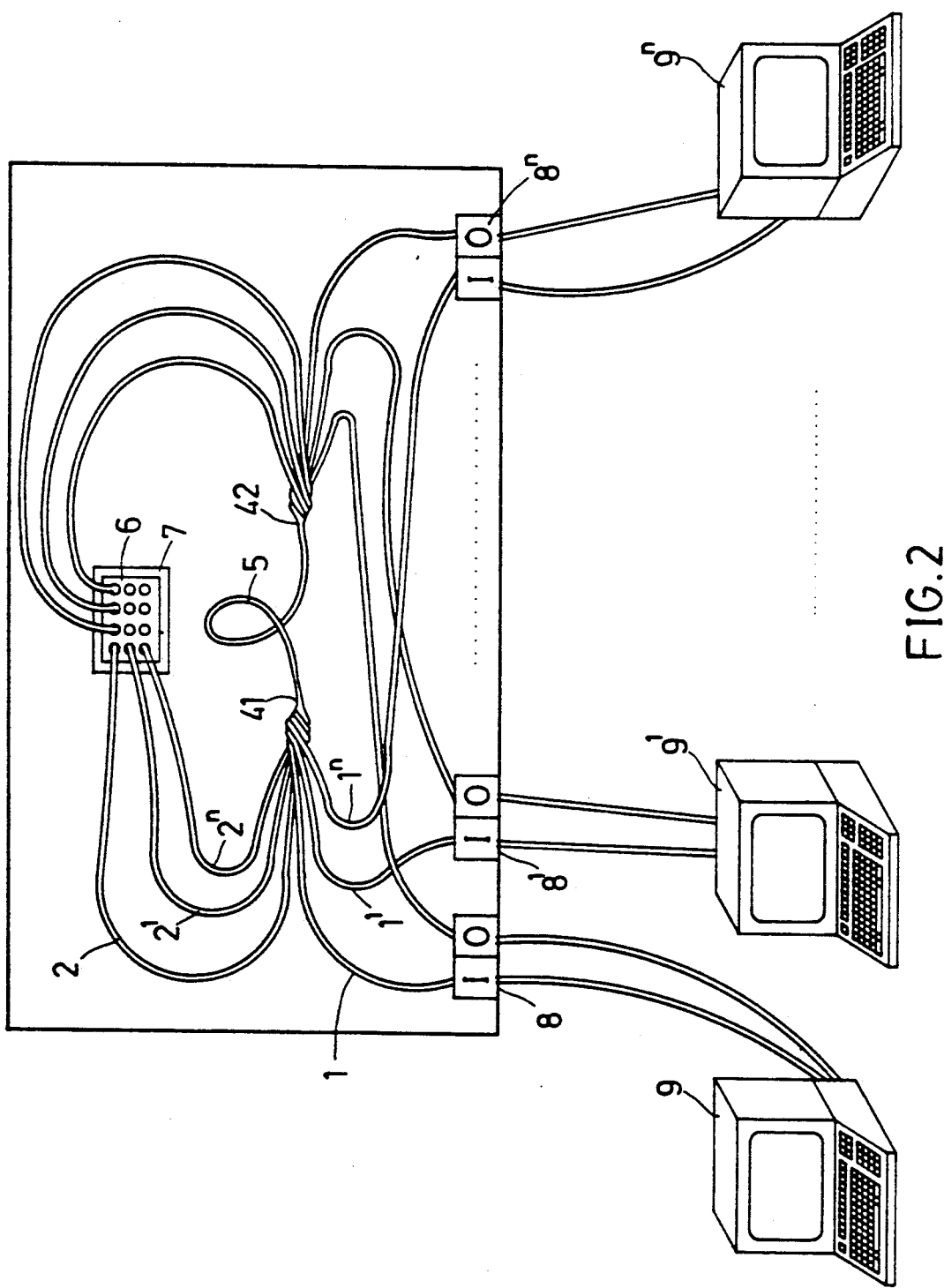
FIG. 2 shows the arrangement of the fiber star amplifier coupler and the terminals connected the input ports and output ports.

Please now refer to FIG. 2. The signal fibers $1, 1', \ldots 1^\eta$ used in the fiber star amplifier coupler of this invention can be either single mode fibers or multimode fibers while the pump fibers $8, 8', \ldots 8^\eta$ can be fibers with high numerical-aperture and large core size. The number of the terminals can be increased if necessary.

Figure 3:
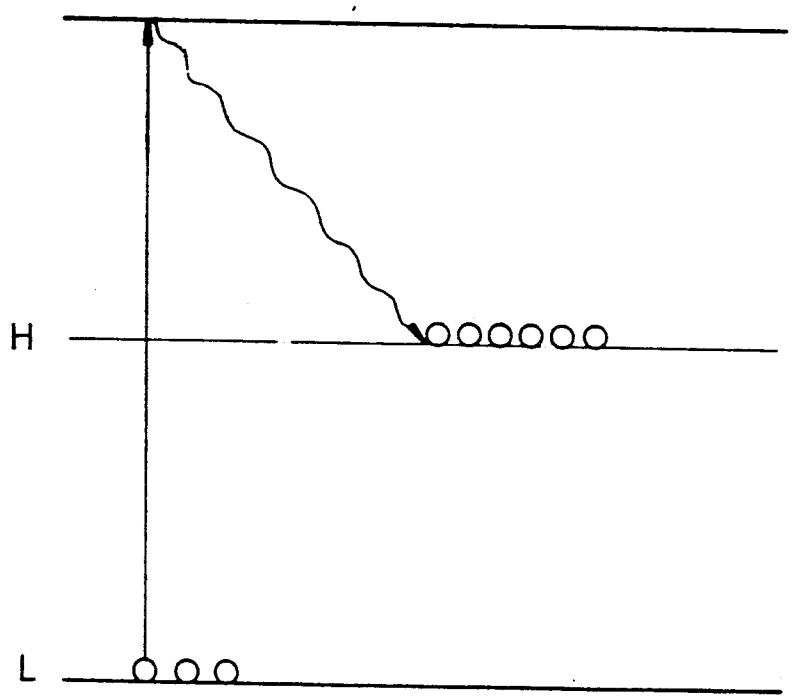
FIG. 3 shows that the electrons of the erbium element absorb pump light to be excited from ground state L a higher level and then relaxed to the excited state H.
Figure 4A:
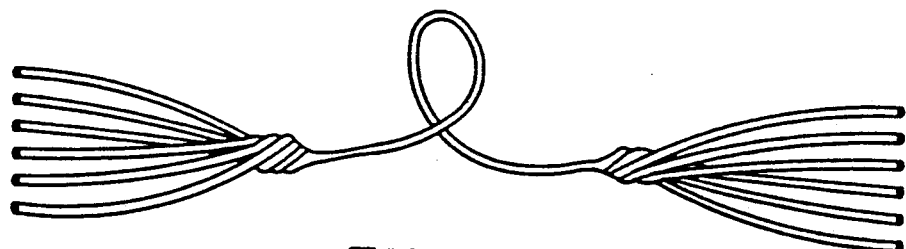
FIGS. 4A through 4D shows several types of the fiber star amplifier couplers of this invention.
Figure 4B:
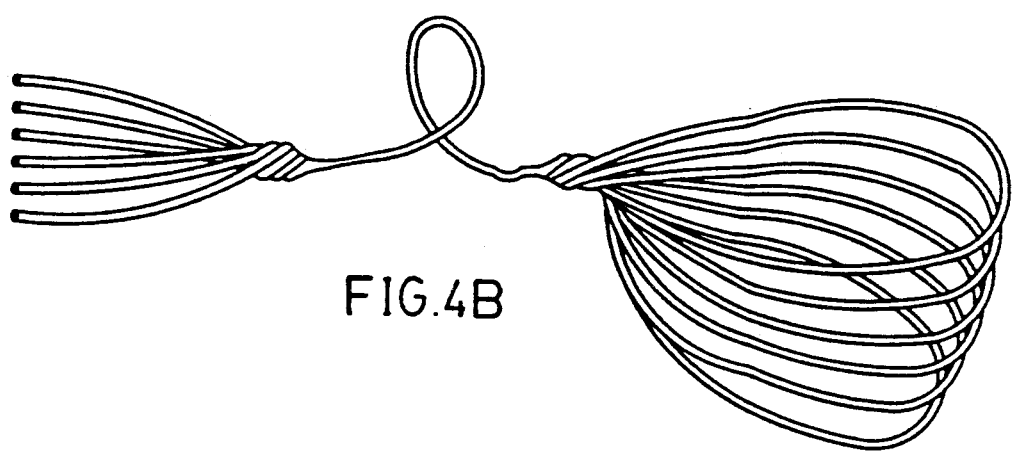
Figure 4C:
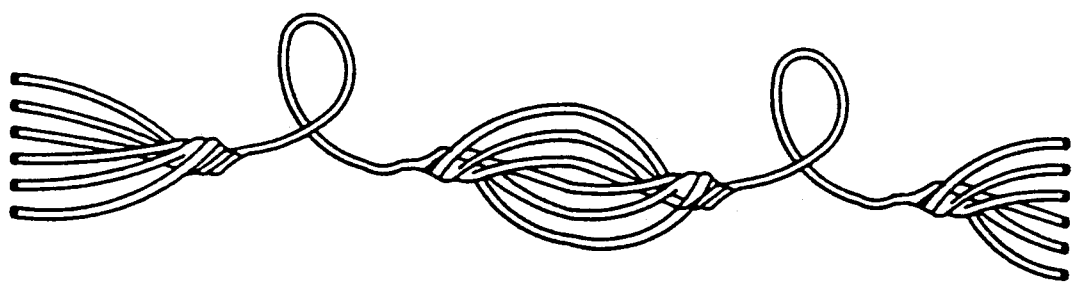
Figure 4D:
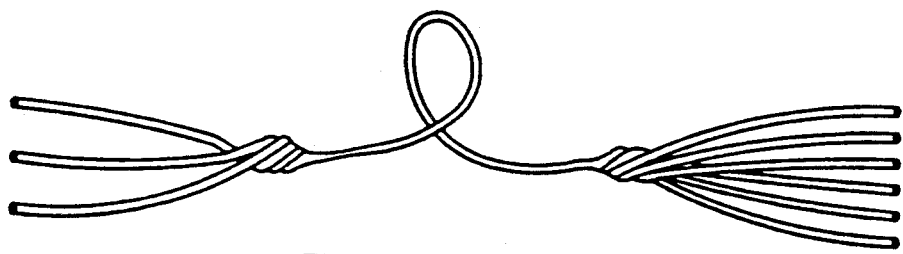

Please now refer to FIG. 3, wherein the electrons of the Er element in the Er-doped amplifier fiber are energized from the basic state L to an energized state H by the pump light. When signal light is coupled into the amplifier fiber, the electrons will drop to a lower energy level to emit a radiation with the same wave length and phase as the signal light. Therefore, the signal light is amplified. For instance, if the amplifier fiber 5 is Er-doped fiber, the pump wavelength can be 822 nm, 980 nm or 1480 nm. Other type of rare earth doped amplifier fiber also can be used, depending on the signal wavelength. Therefore, with appropriate pump power, the present invention can not only distribute the input light evenly into every output ports but will also do internal signal amplification. So the signal insertion loss (from input port to output ports) will be significantly reduced and more ports can be serviced by a single coupler. Comparing the sum of power from all output ports with the input power will show a net gain of more than 6 dB to even 40 dB. With this invention, more than 100 distributed terminals can all be serviced by a single fiber star amplifier coupler.

Referring to FIGS. 4A through 4D, many different type of fiber star amplifier coupler can be made, for example, the transmission type is shown in FIG. 2A, the reflection type as shown in FIG. 2B, the cascaded transmission type as shown in FIG. 2C and the asymmetrical type as shown in FIG. 2D.

As indicated, the structure herein may be variously embodied. Recognizing various modifications will be apparent, the scope hereof shall be deemed to be defined by the claims as set forth below.

What is claimed is:

1. A fabricating method of a fiber star amplifier coupler, comprising:
    twisting at least two signal fibers and at least one pump fiber together;
    fusing the twisted portion of said signal fibers and pump fibers by means of flame fusion to form a biconical tapered portion;

splitting said biconical tapered portion at the midpoint thereof;

splicing a section of amplifier fiber in between two fused tapered ends formed in said splitting procedure;

grouping said pump fibers together and putting said pump fibers into an N×M array connector to mate with an N×M surface emitting laser diode array;

respectively connecting said signal fibers to input-/output ports which further connect to terminals.

2. A fiber star amplifier coupler, comprising:

at least two signal fibers the input ends and output ends of which are respectively connected to input ports and output ports;

at least one pump fiber which is grouped and twisted together with said signal fibers, the twisted portion being fused by means of flame fusion method to form a biconical tapered portion, said biconical tapered portion being split at midpoint thereof;

an amplifier fiber spliced between two fused tapered ends, said amplifier fiber amplifying the signals and evenly distributing the input light into every output ports;

an N×M array connector into which said pump fibers are put; and a pump light source mating with said N×M array connector, said pump light source being capable of emitting pump light with predetermined wavelength and coupling said pump light into said amplifier fiber through said pump fiber.

3. A fiber star amplifier coupler as claimed in claim 2, wherein said signal fiber is one of single mode fiber and multimode fiber and said pump fiber is a fiber with high numerical-aperture and large core size and said amplifier fibr is Er-doped fiber.

4. A fiber star amplifier coupler as claimed in claim 2, wherein said pump light source is an N×M surface emitting laser diode array.

* * * * *

UNITED STATES PATENT AND TRADEMARK OFFICE
CERTIFICATE OF CORRECTION

PATENT NO. : 5,077,817

DATED : December 31, 1991

INVENTOR(S) : Hen-Tai SHANG

It is certified that error appears in the above-identified patent and that said Letters Patent is hereby corrected as shown below:

On the Title page, item [73], after "Telecommunication Laboratories, Ministry of Communications, Taiwan" insert --Hen-Tai Shang, Taiwan--.

Signed and Sealed this

First Day of March, 1994

Attest:

BRUCE LEHMAN

*Attesting Officer*     *Commissioner of Patents and Trademarks*